(12) United States Patent
Ito

(10) Patent No.: US 8,018,512 B2
(45) Date of Patent: Sep. 13, 2011

(54) IMAGE PICKUP DEVICE

(75) Inventor: Hiroshi Ito, Tokyo (JP)

(73) Assignee: Olympus Corporation, Tokyo (JP)

( * ) Notice: Subject to any disclaimer, the term of this patent is extended or adjusted under 35 U.S.C. 154(b) by 722 days.

(21) Appl. No.: 12/100,635

(22) Filed: Apr. 10, 2008

(65) Prior Publication Data

US 2008/0252765 A1 Oct. 16, 2008

(30) Foreign Application Priority Data

Apr. 10, 2007 (JP) ................ P2007-102492

(51) Int. Cl.
*H04N 3/14* (2006.01)
(52) U.S. Cl. ........................................ 348/296
(58) Field of Classification Search ............... 348/222.1, 348/254, 308, 230.1, 296, 367; 345/814
See application file for complete search history.

(56) References Cited

U.S. PATENT DOCUMENTS

| | | | | |
|---|---|---|---|---|
| 2002/0175954 A1* | 11/2002 | Pearson | ........... | 345/814 |
| 2006/0033823 A1* | 2/2006 | Okamura | ........... | 348/254 |

FOREIGN PATENT DOCUMENTS

| | | |
|---|---|---|
| JP | 07-050786 | 2/1995 |
| JP | 07-298112 | 11/1995 |
| JP | 2006-245784 | * 9/2006 |

* cited by examiner

*Primary Examiner* — David Ometz
*Assistant Examiner* — Akshay Trehan
(74) *Attorney, Agent, or Firm* — Volpe and Koenig P.C.

(57) ABSTRACT

The present invention resides in an image pickup device capable of reducing the deformation of the image of the photographed object. An image pickup element included in the image pickup device has a matrix of pixels, for which the control of the charge storage and the readout of image signal data is performed on a row-by-row or column-by-column basis. The storage controller controls the charge storage operation of the image pickup element. On the other hand, the readout controller controls the readout of the image signal data from the image pickup element, while keeping constant the unit period for the readout of the image signal data from the image pickup element. A synchronization signal generator provides a synchronization signal as a timing reference for the frame-based operation of the image pickup element. The synchronization signal period controller variably controls the repetition period of the synchronization signal, while the photographing is under way.

6 Claims, 17 Drawing Sheets

IMAGE PICKUP DEVICE

BACKGROUND OF THE INVENTION

1. Field of Invention

The present invention relates to an image pickup device capable of changing, while the photographing is under way, the repetition period of a synchronization signal (a frame rate), which provides a timing reference for the frame-based operation of image pickup device.

Priority is claimed on Japanese Patent Application No. 2007-102492 filed on Apr. 10, 2007, the content of which is incorporated herein by reference.

2. Description of Related Art

X-Y address type image pickup elements, typically exemplified by a CMOS image sensor, which can be readily controlled for charge storage and readout of photographed image signal on a row-by-row or column-by-column basis, are favored because of their capability of performing high speed imaging at low power consumption. Those X-Y address type image pickup elements are likely to find increasingly broader use in view of their high speed, low power performance. On the other hand, an X-Y address type image pickup element inherently characterized by the rolling readout of image signal data on a row-by-row or a column-by-column basis, under which the sequential charge storage (rolling shutter) of image signal data is performed for those photographed image signals with readout timing virtually coincident with the start/end of the charge storage, has a disadvantage of causing in-frame deformation of a moving image due to the row-to-row or column-to-column storage time lag (to be described in more detail below). While a more advanced X-Y address type image pickup element has been developed in recent years, which is capable of simultaneous storage (global shutter), such an image pickup element still has those various problems of diminished performance in terms of sensitivity, saturation and noise, and of tendency to cause blooming, which are attributed to element structure involving a greater number of transistors provided for each pixel. These are the problems to be solved before such a recently developed image pickup element can be put into practical use.

Japanese Patent Application, First Publication No. H7-298112 (referred to as Reference 1 hereunder) teaches an image pickup device capable of arbitrarily changing the frame rate of the image signal by changing the repetition period of the synchronization signal.

Japanese Patent Application, First Publication No. H7-50786 (referred to as Reference 2 hereunder) shows another image pickup device capable of expanding dynamic range while reducing noise, by the operating process of combining a plurality of consecutive field signals into one frame signal.

In an X-Y address type image pickup element, a change in both the storage/readout period and the frame rate entails the problems outlined below. It is assumed here that the X-Y address type image pickup element is of the type capable of row-by-row rolling.

First Problem

Referring to FIG. 13 illustrating an imaging operation performed at an ordinary frame rate, it is assumed that the photographed image 1300 of an object moves horizontally within one frame period along the major plane of the image pickup element. The part denoted by symbol (a) in FIG. 14 shows a one-frame portion of the photographed image, while the part denoted by symbol (b) in FIG. 14 shows the timing for the operation of the image pickup element. Image signal data is read out within one frame period, which is defined by synchronization signal 1400, from the first row to the last row of pixels constituting the image pickup element. In the part (b) of FIG. 14, a point 1410 denotes a readout start timing for the first row of the image sensor, while a point 1420 denotes a readout start timing for the last row of the image sensor.

The part denoted by symbol (a) in FIG. 15 shows a row-by-row illustration of pixels constituting the image pickup element, while the part denoted by symbol (b) in FIG. 15 shows timing for the operation of the image pickup element in greater detail than the part (b) of FIG. 14. Image signal data is read out from each of the rows during one scanning line period, which is defined by the repetition period of synchronization signal 1500. More specifically, taking the first row for example, at the timing of the completion of the charge storage of the immediately preceding frame, the stored video signal data is read out simultaneously from all the pixels in the first row, and then temporarily stored in a signal holding member (not shown) consisting of capacitors and the like, allowing the signals from each of the pixels to be sequentially read out in a single scanning line period. The signal data storage for the next frame is started virtually at the same timing as the completion of the readout from the current frame of the image signal.

Since the read out timing for the first scanning line and that for the last scanning line are not identical as described above, the photographed image suffers the so-called moving image deformation as shown by horizontally deformed photographed image 1430 in the part (a) of FIG. 14. In another image pickup element adapted to perform column-by-column rolling operation, the deformation direction shown in the part (a) of FIG. 14 will be reversed in terms of horizontal/vertical directions of the display.

Description will now be given concerning the situation where the imaging is performed at a low frame rate. Referring to FIG. 16, it is assumed that photographed image 1600 moves horizontally along the major plane of the image pickup element within one frame period as in the above-described case of performing the imaging at an ordinary frame rate. The part denoted by symbol (a) in FIG. 17 shows the image of one frame which was imaged at this time while the part denoted by symbol (b) in FIG. 17 shows the timing for the operation of the image pickup element. As shown in the part (b) of FIG. 17, the low frame rate imaging, under which the frame period is longer than the ordinary frame rate imaging, allows the object to be photographed to move over a greater distance within a frame period than in the ordinary frame rate imaging. In addition, there is a greater time lag between the readout of the first scanning line and that of the last scanning line. As a result, the horizontal deformation becomes greater as shown by photographed image 1700 in the part (a) of FIG. 17.

As described above, an image pickup element adapted to perform the rolling operation involves the problem of the moving image deformation of photographed object, which becomes particularly conspicuous for low frame rate imaging. However, the above reference 1 shows nothing about countermeasures to the problem described above.

Second Problem

In some cases, a photographer may choose a mode of operation which allows the frame rate and the storage time for the photographed image to be gradually changed, depending on the motion of the object to be photographed. Such mode of operation is frequently chosen to achieve special effects, since it allows a slow replay of a moving image recorded at a higher frame rate or a fast replay of a moving image recorded at a lower frame rate. In the case of the gradual change of frame rate, the storage time is changed along with the change in frame rate to compensate for the out-of-focus state caused by the motion, thereby to produce more natural slow motion or fast motion moving images An image pickup element adapted to perform the rolling operation, in which the end of storage operation and the start of readout operation are brought into coincidence, involves constraints in its operation outlined below. In general, the operation of an image pickup element is controlled by an electrical pulse on a row-by-row or column-by-column basis. In an X-Y address type image pickup element adapted to the rolling operation, the pulse is provided by a simple circuit structure, wherein the supply of a single original pulse is delayed through a shift register on the row-by-row or column-by-column basis. It is therefore impossible to simultaneously perform different controls concerning a plurality of rows or columns within a frame. More specifically, during the charge storage/readout control performed for the current frame, the same control for the immediately following frame cannot be performed.

Further description will now be given assuming that the frame rate is fixed while the charge storage time (storage time) is changed. In FIG. 18, a frame rate defined by the repetition period of synchronization signal 1800 is fixed and the changeable storage time controlled by the charge storage start timing control is performed by the charge resetting. In FIG. 18, the charge storage control for the next frame is performed during periods A, B and C, in the midst of the on-going charge storage control for the current frame. More specifically, during period A, for example, prior to the start of the charge storage for the last row of the current frame, the charge storage for the first row of the next frame is started. To achieve the performance described above, a plurality of control circuits, for example, need to be provided for the complicated control. Therefore, it is impossible for the above-described arrangement to cope with the situation, where the charge storage time is to be changed greatly and frequently for consecutive frames so that both frame rate and charge storage time may be changed greatly to achieve special effects for moving images.

Third Problem

Some of the recently developed digital still cameras and/or monitoring cameras are adapted to combine image signals obtained from two or more consecutive frame periods into a frame signal of one frame length. This type of cameras suffer conspicuous motion-induced blur in the photographed image of the synthesized frame signal, when the object to be photographed moves very fast, because the position, on the major plane of the image pickup element, of the photographed image shifts from one frame to another. Particularly, if the frame rate is changed at random, the degree of the motion-induced blur varies at random, resulting in extremely unnatural reproduced image, because the system of Reference 2 combines the image signals from a plurality of frames with fixed processing parameters. In addition, since noise generated at the image pickup element varies depending on the charge storage time, noise component appearing in the reproduced moving image is changed at random, making quite unnatural the moving image viewed at the time of replay, if the image signal is obtained from a plurality of frames with the charge storage time changed at random.

Fourth Problem

Change of the frame rate and the charge storage time to achieve a desired special effect can bring cause a vacant period between every two neighboring frame periods, where neither the charge storage nor the readout is performed. Such vacant periods can cause intermittent motion in the image of a moving object to be photographed, resulting in a very unnatural reproduced image.

In view of the First Problem 1 set forth above, it is a first object of the invention to provide an image pickup device capable of reducing the deformation in the reproduced image of an object to be photographed. Also, in view of Problem 2 above, it is a second object of the invention to provide an image pickup device capable of preventing the occurrence of the periods, during which neither the charge storage nor the readout of the image signal data can be controlled. Moreover, in view of Problems 3 and 4 above, a third object of the invention is to provide an image pickup device capable of providing high-quality reproduced images.

SUMMARY OF THE INVENTION

With a view toward resolving the problems described above, the image pickup device of the present invention comprises: an image pickup element having a matrix of pixels with their charge storage and image signal readout controlled on a row-by-row or column-by-column basis; storage controller for controlling the charge storage in the image pickup element; readout controller for controlling the readout of the image signal from said image pickup element; a synchronization signal generator for generating synchronization signals as reference for the timing of the frame-based operation of the image pickup element; and a synchronization signal period controller for variably controlling the repetition period of the synchronization signal while the photographing is under way; wherein the readout controller keeps constant the unit period in which the image signal data is read out from the image pickup element.

In the present image pickup device, the storage controller may keep constant the unit time for the charge storage performed by the image pickup element. Furthermore, in the present imaging device, the storage controller may perform the control such that the charge storage for the next frame is started only after the control for the start of the charge storage for the current frame has been completed. Also, in the present image pickup device, the readout controller may perform the control such that the image signal readout for the next frame is started only after the control for the start of the image signal readout for the current frame has been completed.

In addition, the present image pickup device may further comprise a combined frame signal producing member adapted to combine image signals obtained from at least two consecutive frames into one combined frame signal, wherein the combined frame signal producing member is adapted to combine the image signal of each of the frames with certain weighting factors applied depending on the length of the unit time for the charge storage at the image pickup element and on the length of the repetition period of the synchronization signal. Alternatively, the present image pickup device may further comprise a combined frame signal producing member adapted to combine image signals obtained from at least two consecutive frames into one frame signal, wherein the vacant period between every two neighboring frames is controlled in such a manner that p+1 or more frame-long section of the image signal may be read out within a p frame-long period (p is an integer equal to or greater than unity) defined by the repetition period of the synchronization signal.

DETAILED DESCRIPTION OF THE INVENTION

Embodiments of the present invention will now be described.

Embodiment 1

Figure 1:
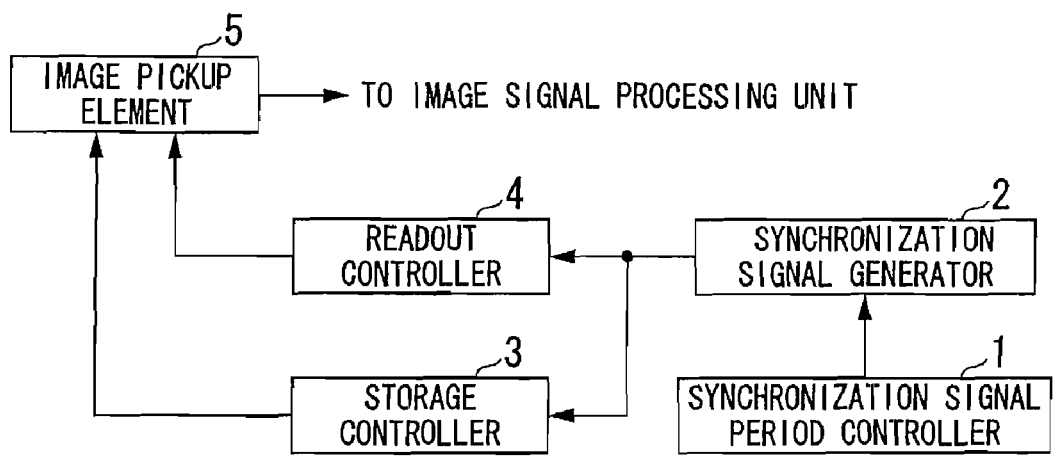
FIG. 1 is a block diagram of an image pickup device according to a first embodiment of the present invention.

Referring to FIG. 1, which shows a first embodiment of the present invention, synchronization signal period controller 1 controls the repetition period of the synchronization signal, which serves as a timing reference for the operation of image pickup element 5. The synchronization signal period controller 1 can change the repetition period of the synchronization signal while the image pickup operation is under way. A synchronization signal generating member 2 generates a synchronization signal, whose repetition period is set by the controller 1, and supplies the signal to a readout controller 4 and a charge storage controller 3.

The charge storage controller 3 generates, responsive to the synchronization signal, a pulse for controlling the charge storage at image pickup element 5, and supply the produced pulse to the image pickup element 5. The readout controller 4 generates, responsive to the synchronization signal, another pulse for controlling the readout of the image signal data from the image pickup element 5, and supplies the produced pulse to the image pickup element 5. The image pickup element 5 is an X-Y image pickup element which has a matrix of pixels which are controlled on a row-by-row or column-by-column basis for the charge storage and the readout of image signal data. While the description will now be given assuming that image pickup element 5 performs the rolling operation on a row-by-row basis, the same description applies similarly to the situation where the rolling operation is performed on a column-by-column basis.

Figure 2:
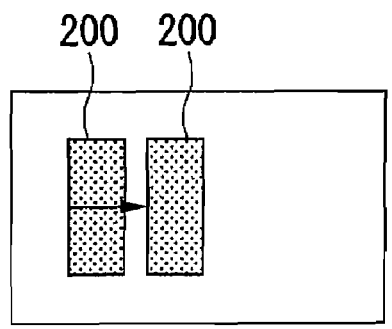
FIG. 2 is a schematic diagram which shows a photographed image of an object which moves along the major plane of the image pickup device according to the first embodiment.
Figure 3:
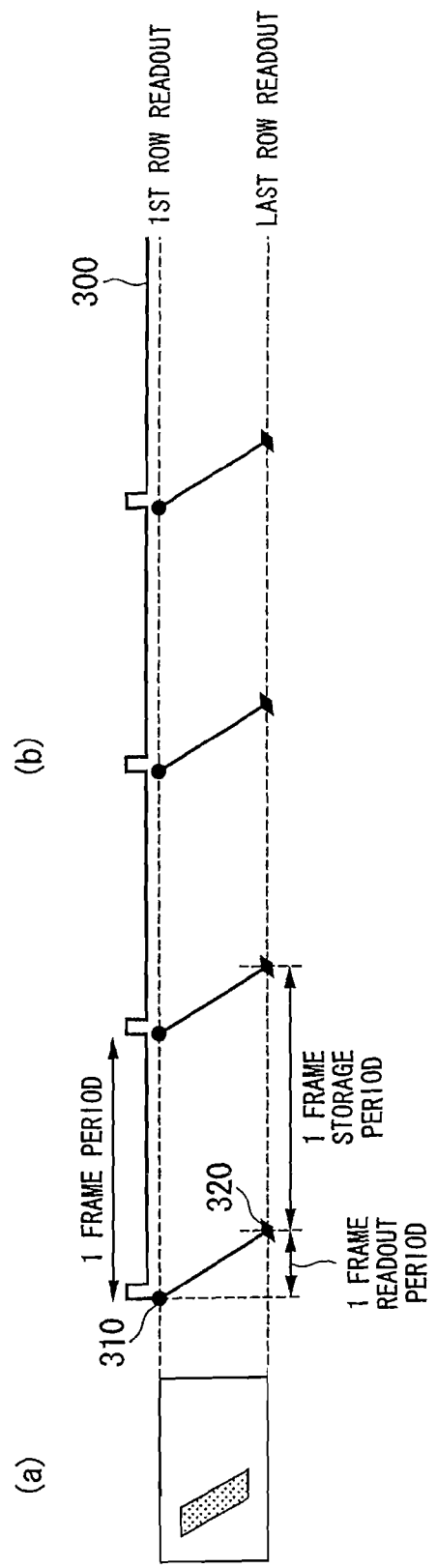
FIG. 3 is a timing chart showing the timing of the operation of the image pickup device according to the first embodiment.

Description will now be given concerning the operation of the image pickup element 5 employed in this embodiment. As shown in FIG. 2, it is assumed that the photographed image 200 of an object moves in the major plane of the image pickup element 5 horizontally within one frame period. The image pickup element 5 performs high speed readout of the image signal within a readout period shorter than the one frame period defined by the period of the synchronization signal. The part denoted by symbol (a) in FIG. 3 shows one frame of an image photographed under the above situation. On the other hand, the part denoted by symbol (b) in FIG. 3 shows timing for the operation of image pickup element 5. During a single frame period, which is defined by the repetition period of synchronization signal 300, the image signal data is read out from the first row of the pixels of image pickup element 5 to the last row thereof. Point 310 denotes the readout start timing for the readout of the first row, while point 320 denotes the readout start timing for the last row.

When the image signal data representative of a photographed image 200, which moves in the major surface of the image pickup element 5 as shown in FIG. 2, is to be read out, image pickup element 5 performs the readout with the readout period, a unit time for the readout of the image signal data, set at a value shorter than the one frame period. Even if the repetition period of the synchronization signal is changed at random, image pickup element performs the readout, keeping the length of the readout period always constant. While it is assumed in FIG. 3 that the synchronization signal has a constant repetition rate (i.e., the frame rate is fixed), the length of the readout period is always maintained at a constant value by the readout controller 4, even when the synchronization signal has variable repetition period.

Figure 4:
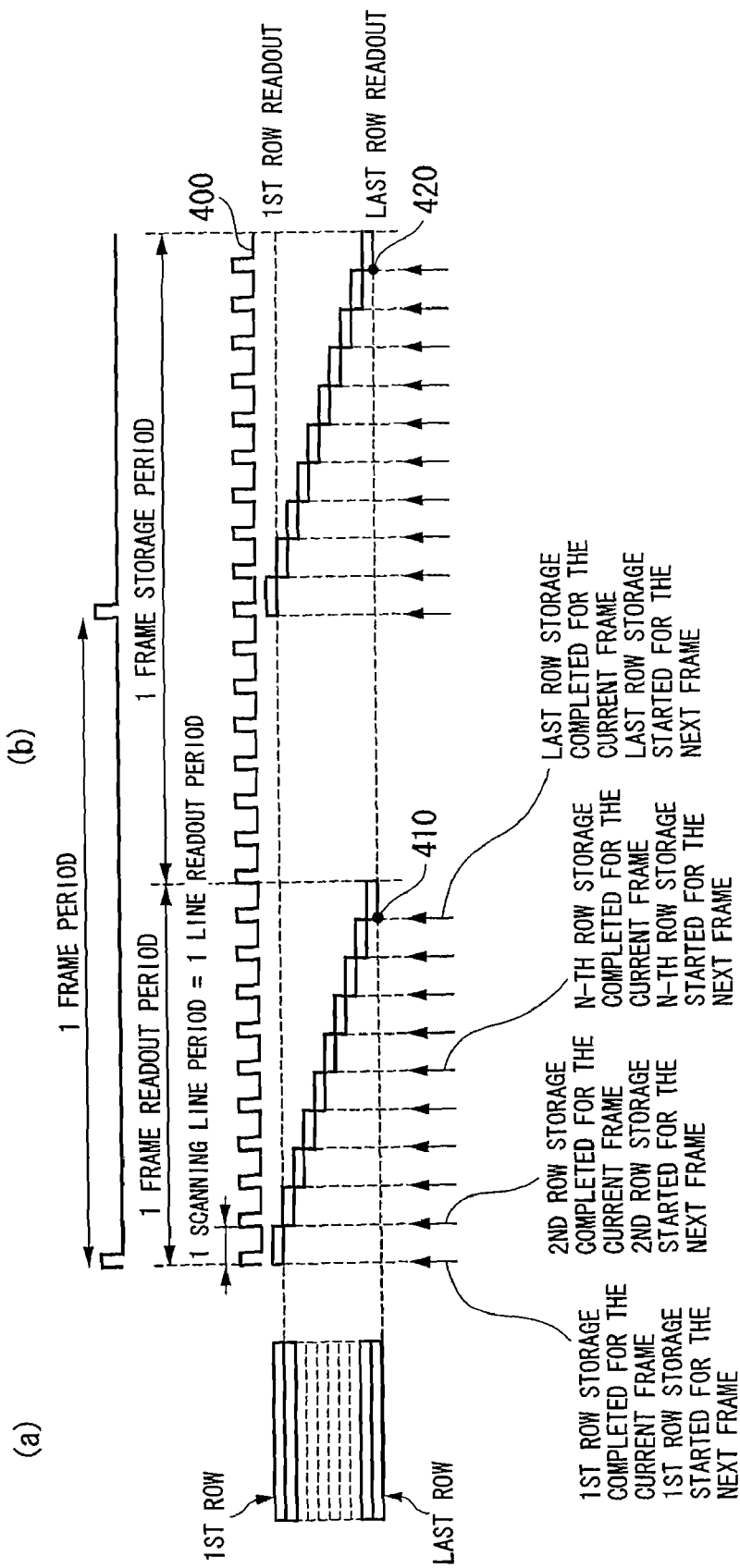
FIG. 4 is a timing chart showing the timing of the operation of the image pickup device according to the first embodiment.

The part denoted by symbol (a) in FIG. 4 shows the first to last rows of the pixels constituting the image pickup element 5, while the part denoted by symbol (b) in FIG. 4 shows, in greater detail than the part (b) of FIG. 3, the timing of the operation of the image pickup element 5. Image signal data is readout from each of the rows during one scanning line period, which is defined by the repetition period of synchronization signal 400. More specifically, taking the first row for example, at the timing of the completion of the charge storage of the immediately preceding frame, the signal data is read out simultaneously from all the pixels in the first row, temporarily stored in the signal holding member such as capacitors not shown, and then the signals from each of the pixels are sequentially read out within a single scanning line period. The data storage for the next frame of the image signal is started virtually at the same timing as the completion of the readout of the data for the current frame.

One frame readout period spanning from the start of the readout from the first row to the completion of the readout from the last row is always kept constant in the above embodiment. On the other hand, one frame storage period is defined as a period from the completion of data readout for the immediately preceding frame, with respect to each row of the pixels, to the start of the readout for the subsequent frame. More specifically, with respect to the last row of the pixels, the readout from all the pixels in the last row for the immediately preceding frame is simultaneously performed by the time point indicated by point 410, and then the readout from all the pixels in the last row for the subsequent frame is simultaneously performed by the time point indicated by point 420, with the duration between time points 410 and 420 defining the frame storage period.

In the first embodiment described above, while the readout timing for the first row data differs from the readout timing for the last row data, the timing difference can be made smaller to the extent possible by performing high-speed readout even under the situation where image pickup is being performed at low frame rate and by keeping constant the readout period even under the situation where the repetition period of the synchronization signal is changed, thereby to stabilize the deformation of the displayed image of photographed object and to stabilize the moving image deformation of photographed object. Thus, the present embodiment reduces the deformation of the displayed image of the photographed object to provide more acceptable video image.

Embodiment 2

Figure 5:
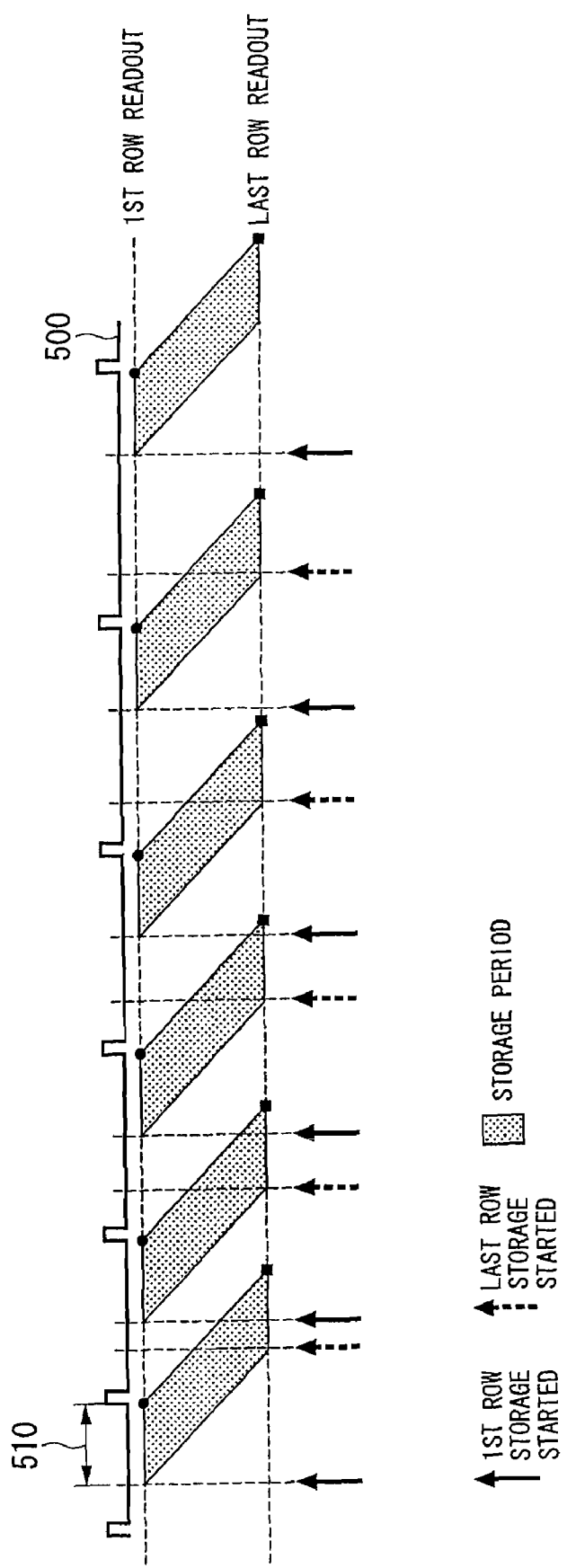
FIG. 5 is a timing chart showing the timing of the operation of the image pickup device according to a second embodiment of the invention.

A second embodiment of the present invention will now be described, whose structure is shown in FIG. 1 identically to the first embodiment. FIG. 5 shows the timing of the operation of the image pickup element 5. In this embodiment, the repetition period of synchronization signal 500 is changed to gradually lower the frame rate. However, the readout period is kept constant even in this embodiment. In addition, even in the case where the repetition period of the synchronization signal is changed, the length of charge storage period 510 (storage time), i.e., the unit time for the charge storage at the image pickup element 5, is kept constant by storage controller 3.

In this embodiment, an image signal of stabilized image deformation and stabilized signal level can be produced even when the repetition period of the synchronization signal is changed. Thus, a high quality reproduced image signal can be obtained, where there is no moving image deformation and frame-to-frame signal level fluctuation.

Embodiment 3

Figure 6:
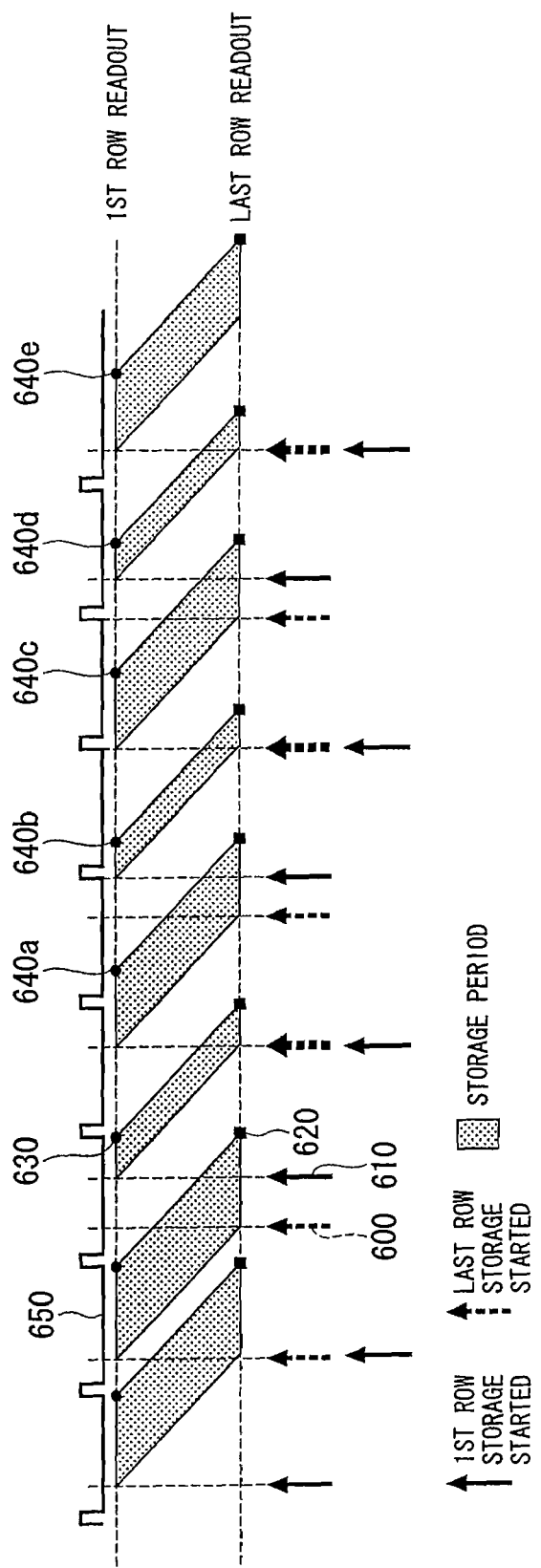
FIG. 6 is a timing chart showing the timing of the operation of the image pickup device according to a third embodiment of the invention.

A third embodiment of the present invention will now be described, whose structure is shown in FIG. 1 identically to the first embodiment. Referring to FIG. 6 shows the timing of the operation of the image pickup element 5. In this embodiment, the timing for the start of the storage and that for the start of the readout are controlled to be shifted within one repetition period of the synchronization signal set by the synchronization signal period controller 1, thereby to prevent the occurrence of the period wherein neither the charge storage operation nor the image signal data readout operation can be performed.

More specifically, the storage start timing for each row of the next frame is shifted by the storage controller 3 with respect to the immediately preceding frame, to satisfy the condition (condition A) that the control to start the charge storage for the next frame is not started until the control to start the charge storage for the current frame is completed. In other words, the storage controller 3 performs the control to start the charge storage for the next frame only after the control to start the charge storage for the current frame has been completed. As a result, the timing (marked by arrow 600) for the start of data storage for the last row of the current frame always precedes the timing (marked by arrow 610) of the start of the charge storage operation for the first row of the next frame.

In addition, the readout controller 4 shifts the readout start timing for each row of the next frame, thereby to satisfy the condition (condition B) that the control to start the readout of the image signal data for the next frame is not performed until the control to start the image signal data readout for the current frame has been completed. More specifically, the readout controller 4 performs the control to start the readout of the image signal data for the next frame only after the control to start the readout of the image signal data for the current frame has been completed. As a result, the timing (point 620) of the start of the readout from the last row of the current frame always precedes the timing (point 630) of the start of the readout from the first row of the next frame.

The storage controller 3 and readout controller 4 provide those electrical pulses to the image pickup element 5, which turn on and off the transistors in image pickup element 5, thereby to achieve the storage and readout control. The electrical pulse are produced by counter circuits contained in storage controller 3 and readout controller 4. In general, a counter circuit is structured to count predetermined pulses or clock pulses, serving as references, with the polarity transition points of the synchronization signal utilized as an operation starting point, so that the polarity may be reversed every time a predetermined count is reached, thereby to provide electrical pulse. In the readout control shown in FIGS. 3 to 5 for example, the rising edge of each of the synchronization pulses is the starting point of the operation of the counter and sets the start of the readout of the image signal data.

In this embodiment, the control to operate the counter is performed, with the starting point for the next frame changed, for example, depending on the conditions set for the preceding frame. More specifically, in FIG. 6, the starting point for the counter in the readout controller 4 may be set not only at the polarity transition points of the synchronization signal, but also at those points where the condition B described above is satisfied. It will be noted in FIG. 6 that the readout start timing denoted by points 640a to 640e does not coincide with the polarity transition timing of synchronization signal 650.

Figure 7:
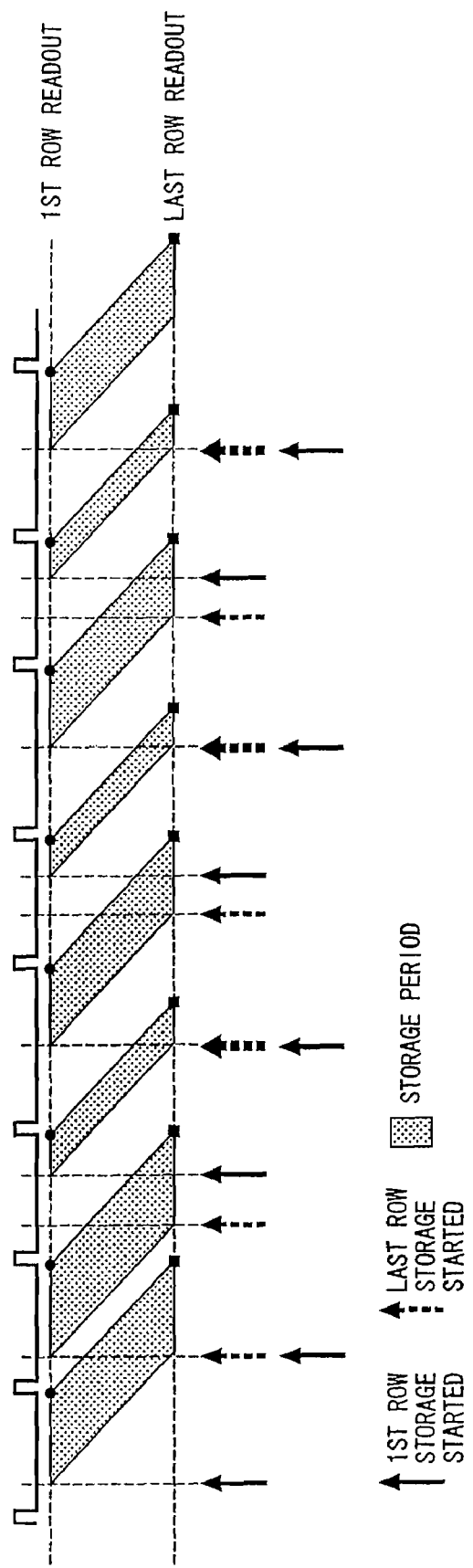
FIG. 7 is a timing chart showing the timing of the operation of the image pickup device according to the third embodiment.

In place of the arrangements described above, synchronization signal generator 2 may be structured to generate a synchronization signal to provide the polarity transition points of the synchronization signal as desired timing, thereby to allow the storage controller 3 and readout controller 4 to operate as in conventional systems, with the polarity transition points used as starting points for the operation of the counter. FIG. 7 shows an example, where the starting point of the counter in the readout controller 4 is always brought to coincide with the polarity transition points of the synchronization signal. It is noted in this case also that conditions A and B described above are satisfied.

Figure 8:
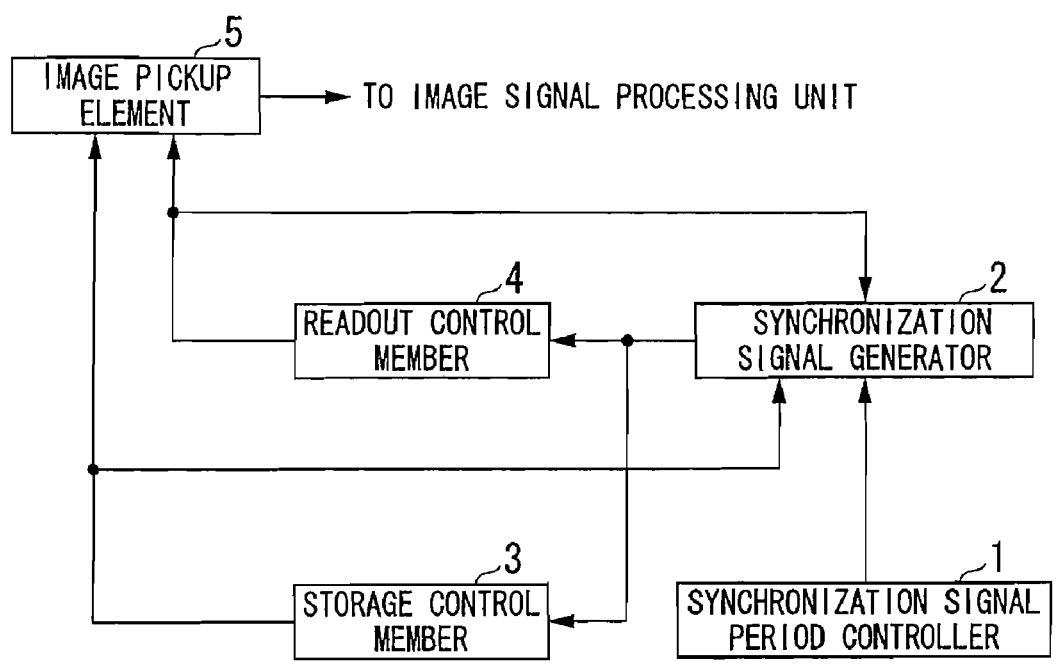
FIG. 8 is a block diagram of an image pickup device according to the third embodiment.

FIG. 8 shows the structure of an image pickup device adapted to control the polarity transition points of the synchronization signal depending on the starting point of the counter associated with the storage control and the readout control. The storage controller 3 determines the timing for the start of storage for each of the frames depending on the frame rate and the storage time, which have been set by the user, and supplies relevant information to synchronization signal generator 2. Similarly, the readout controller 4 determines the timing for the start of the readout for each of the frames depending on the frame rate and the storage time, which have been set by the user, and supplies relevant information to synchronization signal generator 2. If the storage time is predetermined, the notification of the relevant information to synchronization signal may be carried out by only one of the storage controller 3 and readout controller 4, since the timing for the start of the charge storage and that of the readout are interrelated to the storage time. While the setting of the frame rate and the storage time is performed by the user or photographer wishing to achieve a certain special effect, the storage controller 3 and readout controller 4 determine the timing for the start of storage and readout to permit the image pickup element 5 to perform the storage and readout operation in a manner most satisfactory to the user (without changing the manner in which the counter is controlled). The synchronization signal generator 2, responsive to the information from at least one of the storage controller 3 and readout controller 4, reproduce the synchronization signal to supply it to the storage and readout controllers 3 and 4. Responsive to the reproduced synchronization signal, the storage and the readout controllers 3 and 4 internally generate the pulse again automatically for supply it to image pickup element 5.

Figure 9:
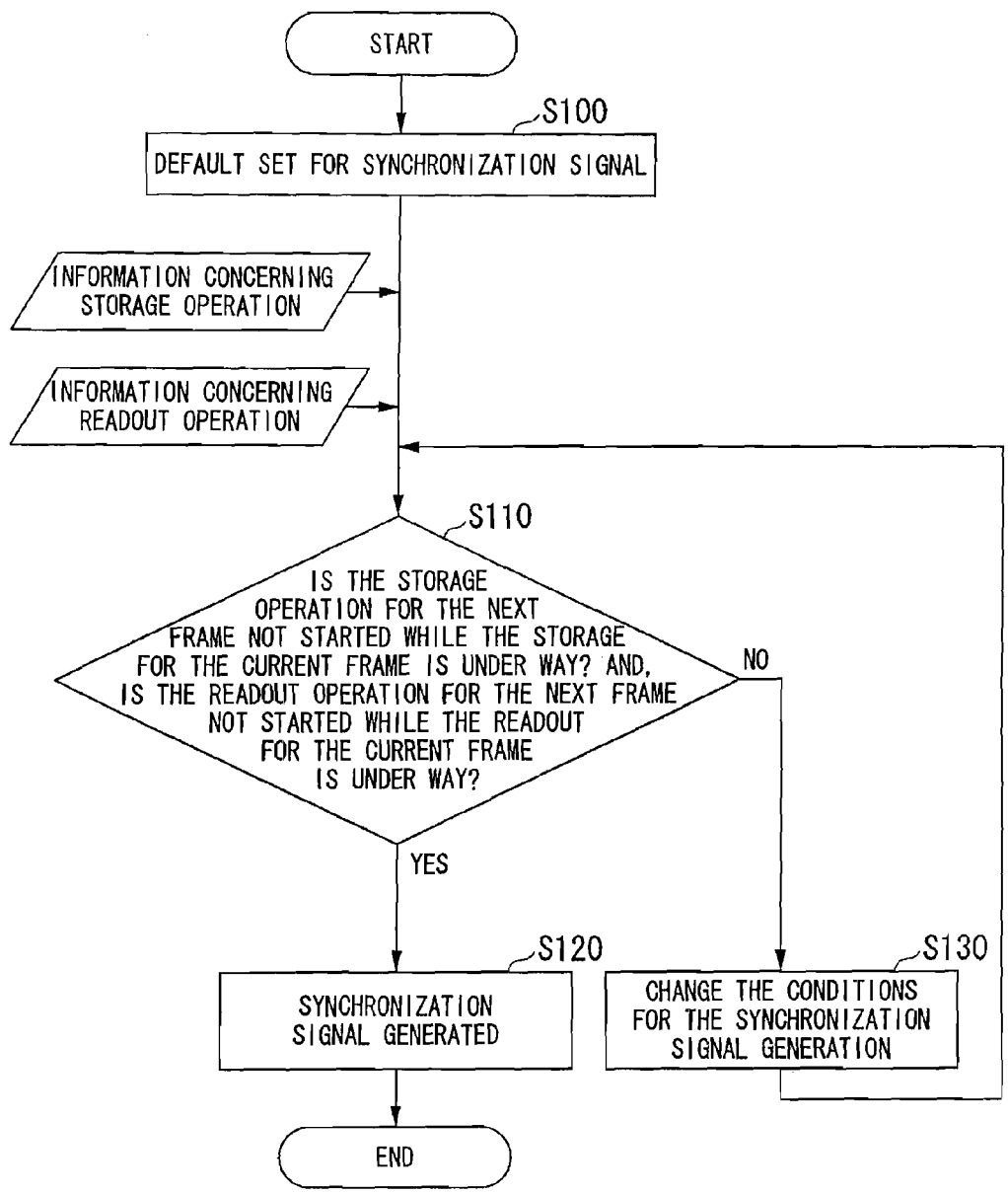
FIG. 9 is a flowchart for the operation of the image pickup device according to the third embodiment.

Referring to FIG. 9, which is a flowchart showing the procedure of the control for the storage operation and the readout operation performed by the image pickup device of FIG. 8, the operation of the image pickup device will now be described. It is noted that the operation illustrated in FIG. 9 is performed on a frame-by-frame basis. While the processing of the current frame is under way, synchronization signal generator 2 performs default setting for the synchronization signal for the next frame, which serves as a reference timing for the storage and readout operations (Step S100).

To synchronization signal generator 2, the storage operation-related information for the next frame supplied from the storage controller 3 (the storage start timing plus the storage time, or the storage start timing plus the storage completion timing), and the readout operation-related information for the next frame supplied from the readout controller 4 (the readout start timing plus readout period, or the readout start timing plus readout completion timing) are inputted. On the basis of these information, the synchronization signal generator 2 determines, under the current synchronization signal setting condition (the condition of polarity transition points), whether the condition that the storage control for the next frame is not started while the storage control for the current frame is under way, and the condition that the readout control for the next frame is not started while the readout control for the current frame is under way, are both satisfied (Step S110).

If these two conditions are both satisfied, synchronization signal generator 2 generates a synchronization signal for the next frame at a timing corresponding to the condition set by the user (Step S120). If at least one of these conditions is not satisfied, synchronization signal generator 2 changes the set condition of the synchronization signal (Step S130), and performs the decision of step S110 again. While the decision is performed for both the storage control and the readout control in the above embodiment, only one of the above control may be performed instead of two.

As described above, the third embodiment described above can prevent the occurrence of the period wherein the control for the charge storage operation is impossible, by performing the control to start the charge storage of the image signal for the next frame only after the completion of the control to start the charge storage of the image signal for the current frame. Also, the third embodiment can prevent the occurrence of the period in which the control for the charge storage operation is impossible, by performing the control to start the readout of the image signal for the next frame only after the completion of the control to start the readout of the image signal for the current frame.

Embodiment 4

Figure 10:
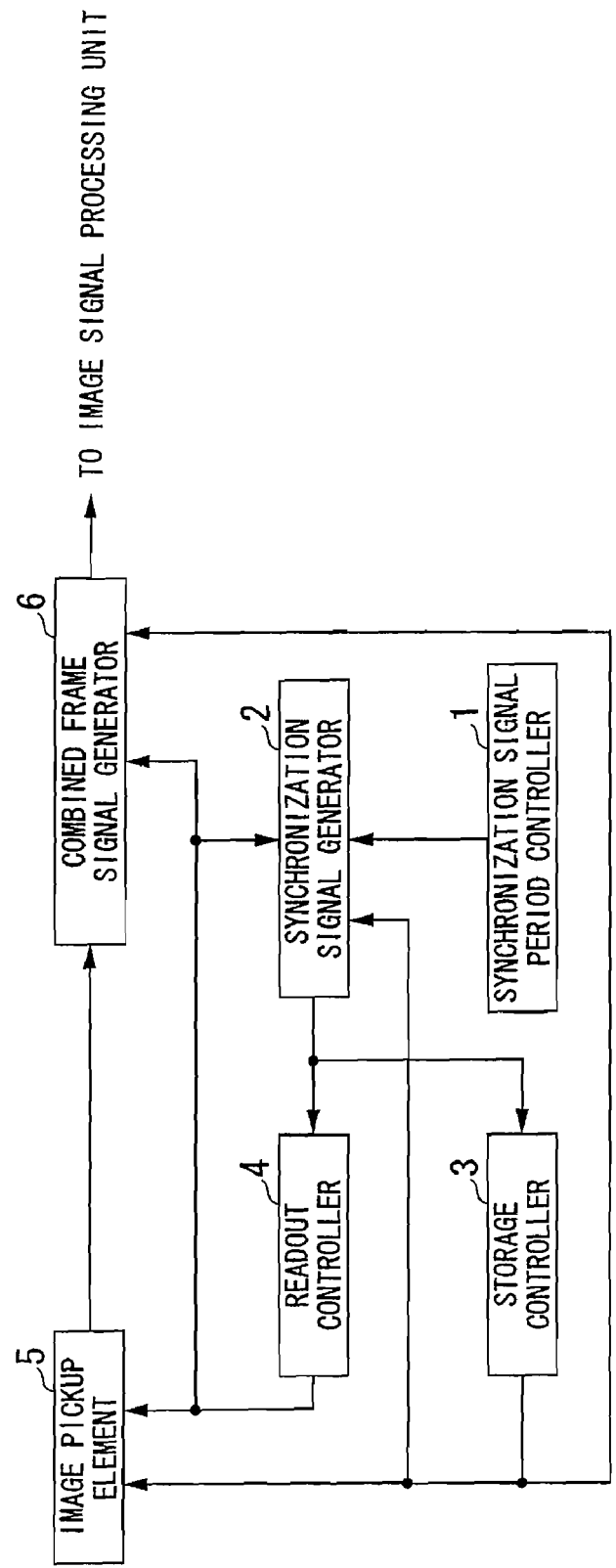
FIG. 10 is a block diagram of an image pickup device according to a fourth embodiment of the invention.

A fourth embodiment of the present invention will now be described referring to FIG. 10, which shows in blocks the embodiment. In this embodiment, the image signal from the image pickup element 5 is supplied to the combined frame signal generator 6, which is adapted to provide a combined frame signal of one frame length by combining image signals obtained from at least two consecutive frames.

More specifically, combined frame signal generator 6 provides a combined frame signal Fc as shown in Equation 1, with Fs(n) denoting n frame-long image signals to be combined (n is an integer greater than 1). In Equation 1, i(k) denotes a coefficient dependent on the storage time for the k-th frame; and f(k), another coefficient dependent on the frame rate for the k-th frame. It will be noted that the values for Fc and Fs(k) correspond to the image signal levels for respective pixels:

Equation 1

$$Fc = \sum_{k=1}^{n} i(k) \times f(x) \times Fs(k) \qquad (1)$$

The longer the storage time is, the greater is the motion-induced blur of the object to be photographed. However, the adverse effect of such blur can be lessened by making the value i(k) inversely proportional to the storage time. In addition, this embodiment has the feature of the charge time-dependent quantity of light incident upon the image pickup element 5 and the accompanying noise fluctuation, which are caused by the variable optical shot noise involved in the image pickup element 5 varying in proportion to the quantity of light incident thereon. If the combining of image signals obtained from a plurality of consecutive frames is performed with a fixed parameters as in conventional approaches, the noise visible in the reproduced image vary depending on the charge time, resulting in unnatural images. However, in the present embodiment, due to the adjustment applied to the value i(k) depending on the change in the charge time, the noise components can be made less conspicuous, giving the reproduced images more natural.

In addition, while the moving image deformation of photographed object becomes greater as the frame rate is reduced, the adverse effect of such moving image deformation observed in the combined frame signal can be lessened in this embodiment, due to the value f(k) made inversely proportional to the frame rate.

Figure 12:
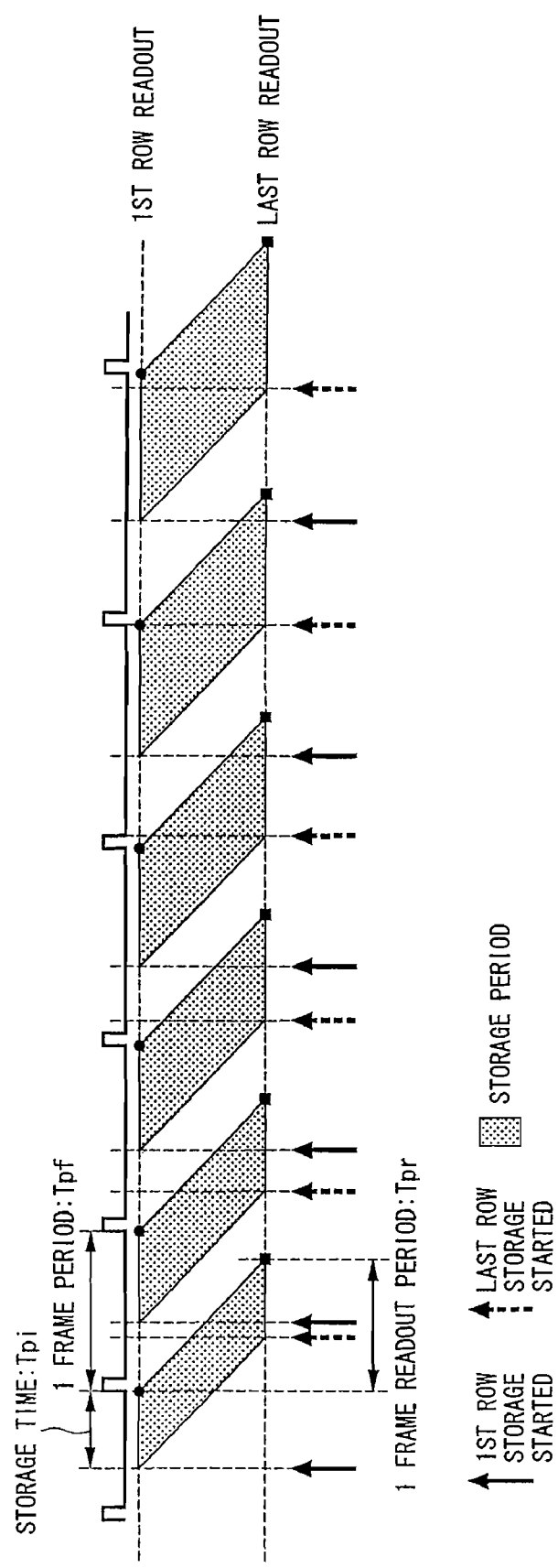
FIG. 12 is a timing chart showing the timing of the operation of the present image pickup device, wherein the charge storage time is changed along with the frame rate.
Figure 13:
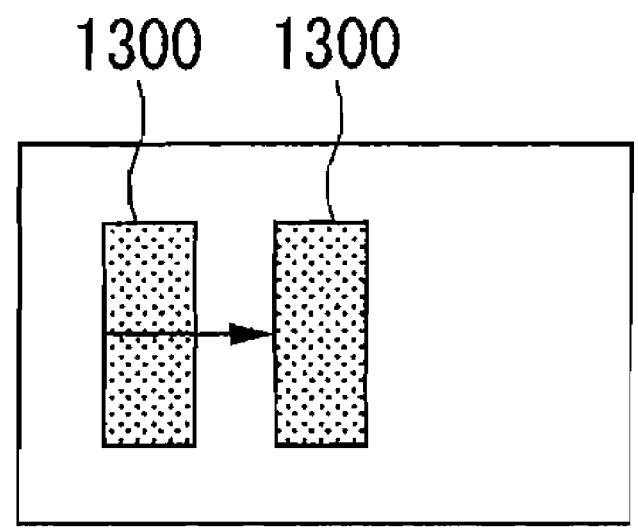
FIG. 13 schematically shows a photographed image which moves along the major plane of the image pickup device.
Figure 14:
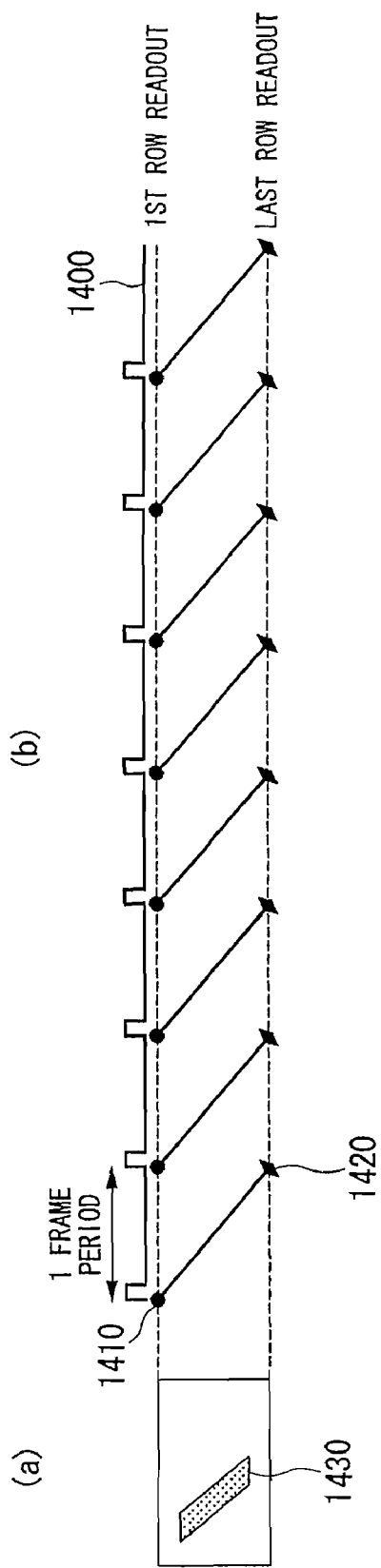
FIG. 14 is a timing chart showing the timing of the operation of a conventional image pickup device.
Figure 15:
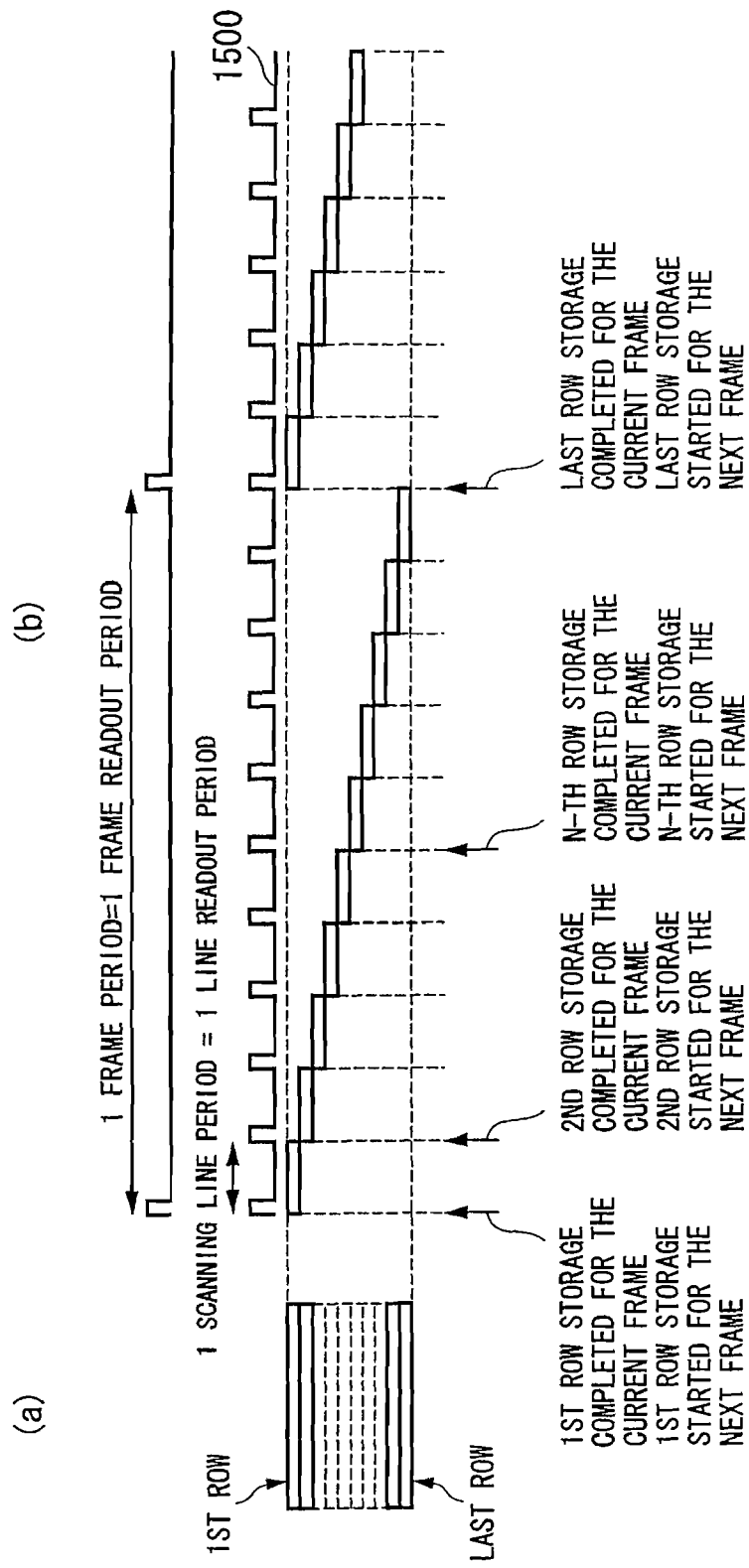
FIG. 15 is a timing chart showing the timing of the operation of a conventional image pickup device.
Figure 16:
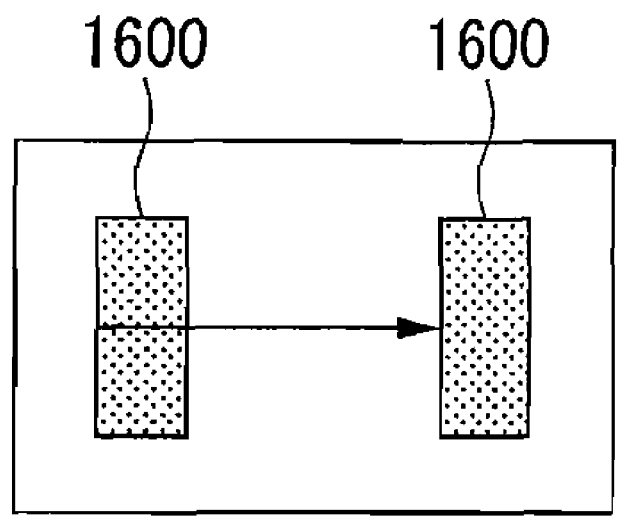
FIG. 16 is a schematic diagram which shows a photographed image which moves along the major plane of the conventional image pickup device.
Figure 17:
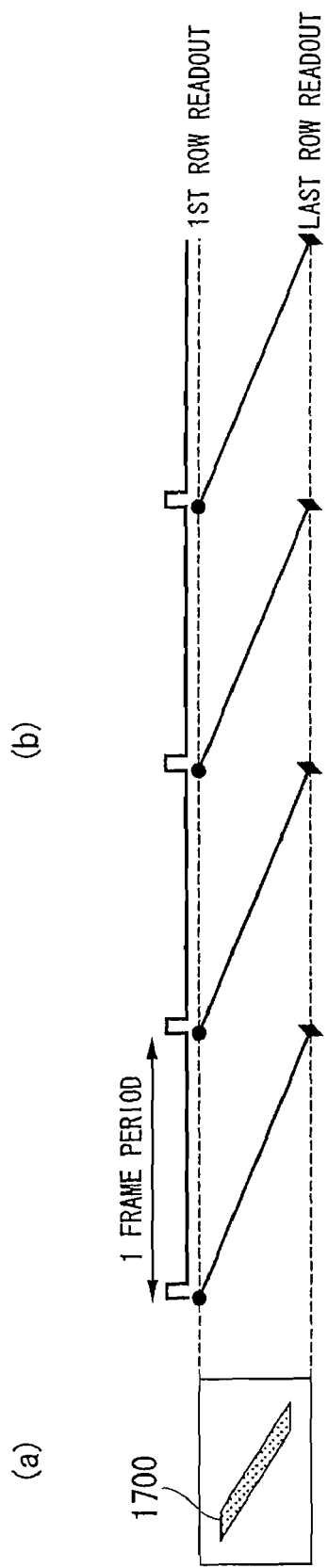
FIG. 17 is a timing chart showing the timing of the operation of a conventional image pickup device.
Figure 18:
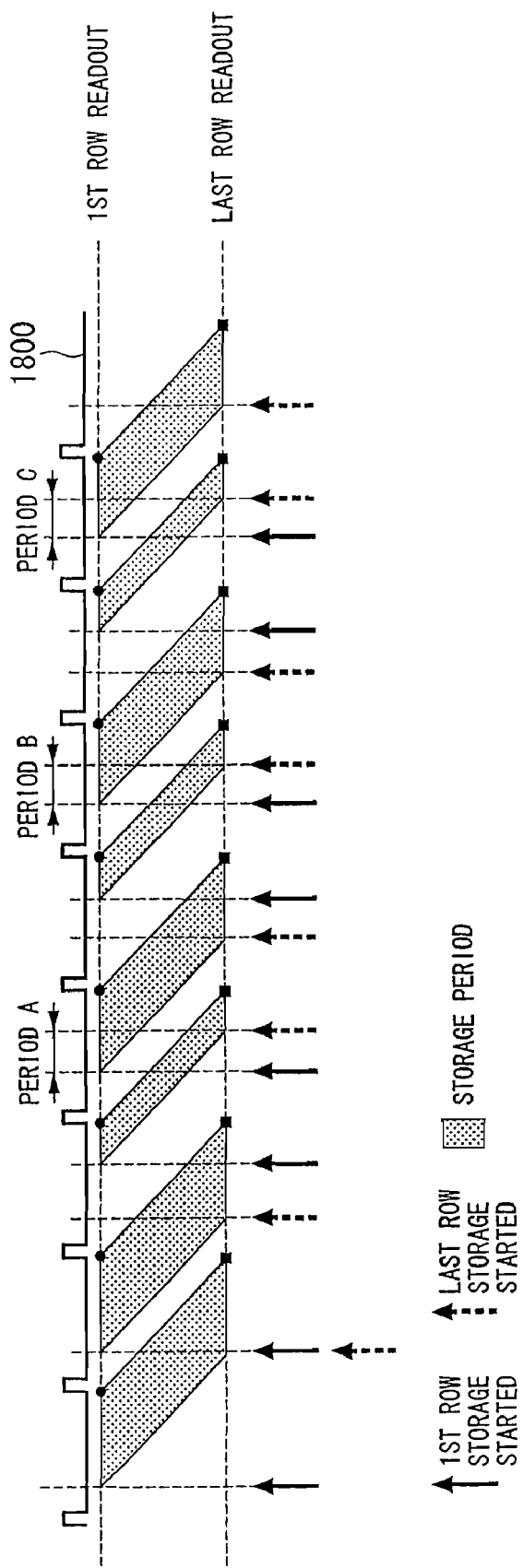
FIG. 18 is a timing chart showing the timing of the operation of a conventional image pickup device.

The present embodiment is also adapted to perform, as described below, the control of the vacant period, in which neither the charge storage of image signal nor the readout of the image signal is performed. Referring to FIG. 12 showing the timing for the operation of common image pickup device adapted to change both the frame rate and the storage time, it will be seen that the storage time becomes longer as the repetition period of the synchronization signal is made gradually longer.

It is assumed here that the one frame period for the p-th frame is denoted by Tpf[s], storage time by Tpi[s], and frame readout period by Tpr[s] (p is an integer). In FIG. 12, it will be noted that the charge storage-related vacant period spans from the resetting of the charge to the start of the readout of image signals, which excludes the charge storage period, while the readout-related vacant period spans the period excluding the frame readout period. The present embodiment makes it possible to perform the control to eliminate the vacant period by properly collecting the vacant periods to turn such periods into effective image pickup period.

The storage controller 3 and readout controller 4 (alternatively, one of these controllers 3 and 4) determines, on the basis of information concerning storage operation and readout information which have been set in advance, whether there is a vacant period with respect to each of the frames. The determination of presence or absence of such vacant period is performed on the basis of whether the conditions of Tpf>Tpr and T(p−1)f>Tpi are simultaneously satisfied. It will be noted that the determination of whether the vacant period is present or not is performed by the comparison between T(p−1)f and Tpi, since the storage time for the p-th frame resides in the (p−1)th frame. The storage controller 3 and the readout controller 4 proceed to perform the calculation of Equation 2, when they determined that a vacant period is present.

Equation 2

$$(m+1) \times [T(p+l)i + T(p+l)r] > \\ \sum_{k=0}^{n-1}[T(p+k)f + T(p+k-1)f] - \sum_{k=0}^{n-1}[T(p+k)i + T(p+k)r] > \\ m \times [T(p+l)i + T(p+l)r] \quad (2)$$

In Equation 2, n, m and l denote an integer and, particularly, n denotes the number of image signals (number of frames) used by combined frame signal generator 6 to provide a frame signal of one-frame length. Similarly, T(p+k)f, T(p+k)i, T(p+k)r denote, respectively, one frame period of the (p+k)-th frame, storage time of the (p+k)-th frame and a one-frame readout period of the (p+k)-th frame. In Equation 2, the formula lying between the two inequalities denotes a total length of vacant periods in n frame periods including the p-th frame.

Integer l is a specific integer, which satisfies the condition l<k. Therefore, if Equation 2 holds, the period necessary for the acquisition of the video signal for the (p+1)-th frame can be set m times for a vacant period. More specifically, if the integer m satisfying Equation 2 above is 3 (m=3) and if the value of n corresponding thereto is 2 (n=2), a three frame-long image signal can be acquired during the two frame-long period for the photographing condition for the (p+1)-th frame. In other words, the three frame-long image signal obtained through the predetermined photographing conditions can be obtained during the period, which was supposed to be assigned for the acquisition of two frame-long image signal.

The storage controller 3 and readout controller 4 calculate, on the basis of equation (2), how many frame long image signal can be obtained during the period wherein the predetermined number of frames are supposed to be photographed and, based on the calculation results, control the storage operation and the readout operation. The information such as the timing for the start of the storage operation and/or the readout operation is outputted through the storage controller 3 and readout controller 4 to combined frame signal generator 6, which determines the timing for the acquisition of each image signal on the basis of the supplied information. On the other hand, synchronization signal generator 2 generates, in response to the information supplied from the storage controller 3 and readout controller 4, a synchronization signal, which is supplied to the above controllers 3 and 4.

Figure 11:
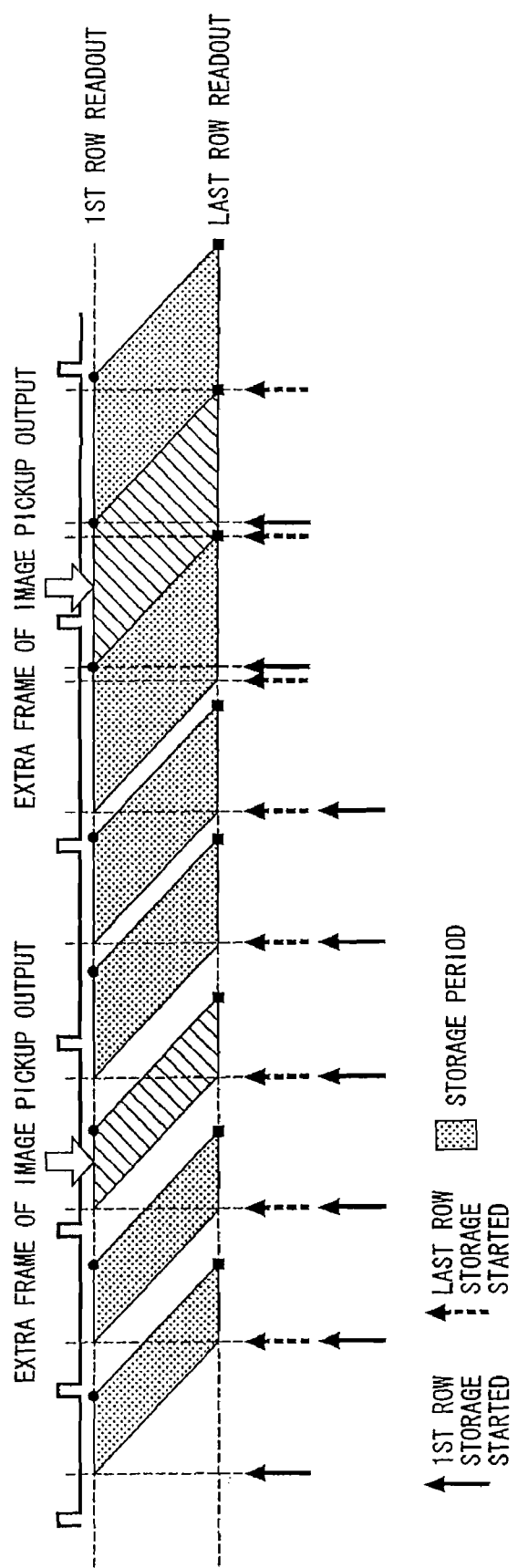
FIG. 11 is a timing chart showing the timing of the operation of the image pickup device according to the fourth embodiment.

Referring to FIG. 11, which shows the timing for the operation of image pickup element 5 in the present embodiment, eight frame-long section of image signal is produced in a six frame-long period. Comparison of the operation shown in FIG. 11 with that shown in FIG. 12 shows that the former permits the image signal of two more frame lengths to be produced within the same period. It will be seen the use of the vacant periods so as to acquire a greater number of image signals, which are processed into combined image signal, provides the following advantageous effects:

(1) The image signal processing can be performed without losing the motion-related information of the photographed image (the motion of the reproduced image does not look intermittent);

(2) Random noise can be suppressed by combining a plurality of frames (n frame-long section of image signal, where n is an integer greater than unity) into a combined image signal of one frame length, whereby the signal level is made n times as high as the pre-combination image signal and the random noise $\sqrt{n}$ times as low as the latter, with a larger number of image signals combined resulting in improved noise suppression.

(3) Processing for dynamic range expansion can be achieved.

As described above, the present embodiment reduces the motion-induced blur or the noise of the photographed image by combining a plurality of frames of image signals with weighting factors applied depending of the storage time and the frame rate, thereby to provide a high-quality reproduced image. Furthermore, the control of the vacant period to increase the number of frames of image signal to be readout, thereby to permit a greater number of frames of image signals to be processed into a combined image signal, provides a higher-quality reproduced image.

While the invention has been described in conjunction with several embodiments, these embodiments have been presented not as a limitation but only by way of example. The invention is intended to cover various modifications, which lie within the scope and spirit of the invention.

According to the present invention, it is possible to reduce the photographed image deformation by keeping constant the unit time for the readout of image signal data from the image pickup element, thereby to keep constant the deformation in the image of the photographed object, even if the repetition period of the synchronization signal is changed.

Also, the present invention is capable of preventing the occurrence of the period in which the charge storage control cannot be performed, by performing the control to permit the start of the charge storage for the next frame only after the completion of the control for the start of the charge storage for the current frame. In addition, the present invention is capable of preventing the occurrence of the period in which the charge storage control cannot be achieved, by performing the control to permit the start of image signal readout for the next frame only after the control for the start of the image signal readout for the current frame has been completed.

Furthermore, the image pickup device of the present invention provides high-quality reproduced images, because the image signals from the plurality of frames are combined with weighting factors applied depending on the length of the unit time for the charge storage at the image pickup element and on the length of the repetition period of the synchronization signal, thereby to reduce the motion-induced blur in the image of the photographed object and/or noise. In addition, the present image pickup device can provide high-quality reproduced images, because it is adapted to control the length of the vacant period, thereby to read out the stored image signal equal in length to p+1 or more frames within a period equal in length to p frames, permitting the image signal component stored in the increased frame to be utilized.

What is claimed is:

1. An image pickup device comprising:
   an image pickup element having a matrix of pixels with their charge storage and image signal readout controlled on a row-by-row or a column-by-column basis;
   a storage controller for controlling the charge storage by the image pickup element;
   a readout controller for controlling the readout of the image signal from the image pickup element;
   a synchronization signal generator for generating first synchronization signals as reference for the first timing of the frame-based operation of the image pickup element; and
   a synchronization signal period controller for variably controlling the repetition period of the first synchronization signal while the photographing is under way; wherein the readout controller keeps constant the unit period in which the image signal data is read out, the synchronization signal generator receives information from the storage controller and the readout controller and generates second synchronization signals as a reference for the second timing of a next frame when a movement requirement is not met, wherein the synchronization signal generator generates the first synchronization signals when the movement requirement is met, and the movement requirement includes a first condition wherein the storage control for the next frame is not started while the storage control for the current frame is under way and a second condition wherein the readout control for the next frame is not started while the readout control for the current frame is under way.

2. An image pickup device as claimed in claim 1, wherein the storage controller keeps constant the unit time for the charge storage performed by the image pickup element.

3. An image pickup device as claimed in claim 1, wherein the storage controller performs the control such that the charge storage for the next frame is started only after the control for the start of the charge storage for the current frame has been completed.

4. An image pickup device as claimed in claim 1, wherein the readout controller performs the control such that the image signal readout for the next frame is started only after the control for the start of the image signal readout for the current frame has been completed.

5. An image pickup device as claimed in claim 1, further comprising a combined frame signal producing member adapted to combine image signals obtained from at least two consecutive frames into one combined frame signal, wherein the combined frame signal producing member is adapted to combine the image signal of each of the frames with certain weighting factors applied depending on the length of the unit time for the charge storage at the image pickup element and on the length of the repetition period of the synchronization signal.

6. An image pickup device as claimed in claim 1, further comprising a combined frame signal producing member adapted to combine image signals obtained from at least two consecutive frames into one frame signal, wherein the storage controller and the readout controller calculates the number of frames in a long image signal that can be obtained within a p frame-long period, wherein p is an integer equal to or greater than unity, defined by the repetition period of the synchronization signal and readout the image signal of P+1 or more frames.

* * * * *